US011472343B2

(12) United States Patent
Ballarin (10) Patent No.: US 11,472,343 B2
(45) Date of Patent: Oct. 18, 2022

(54) REAR-VIEW MIRROR ASSEMBLIES FOR VEHICLES

(71) Applicant: Volvo Truck Corporation, Gothenburg (SE)

(72) Inventor: Paolo Ballarin, Saint Genis Laval (FR)

(73) Assignee: Volvo Truck Corporation, Gothenburg (SE)

( * ) Notice: Subject to any disclaimer, the term of this patent is extended or adjusted under 35 U.S.C. 154(b) by 137 days.

(21) Appl. No.: 16/647,967

(22) PCT Filed: Nov. 9, 2017

(86) PCT No.: PCT/IB2017/001493
§ 371 (c)(1),
(2) Date: Mar. 17, 2020

(87) PCT Pub. No.: WO2019/092470
PCT Pub. Date: May 16, 2019

(65) Prior Publication Data
US 2020/0215981 A1 Jul. 9, 2020

(51) Int. Cl.
*B60R 1/078* (2006.01)
(52) U.S. Cl.
CPC .................... *B60R 1/078* (2013.01)
(58) Field of Classification Search
CPC ......... B60R 1/078; B60R 1/06; B60R 1/0605; B60R 1/0617
(Continued)

(56) References Cited

U.S. PATENT DOCUMENTS 3,131,251 A * 4/1964 Ryan ..................... B60R 1/04
248/467
4,598,982 A * 7/1986 Levine .................... B60R 1/081
359/865
(Continued)

FOREIGN PATENT DOCUMENTS

EP 0115448 A2 8/1984
WO 2016099270 A1 6/2016

OTHER PUBLICATIONS

International Search Report for International Patent Application No. PCT/IB2017/001493, dated Mar. 12, 2018, 10 pages.

*Primary Examiner* — Christopher Garft
*Assistant Examiner* — Michael McDuffie
(74) *Attorney, Agent, or Firm* — Withrow & Terranova, PLLC (57) ABSTRACT

The rear-view mirror assembly comprises: a housing (110); a mirror plate (120, 220, 320, 420) having a front rear-view mirrored surface (122) and a back surface (124, 224, 324, 424); a support arrangement positioned in a recess (112) of the housing (110) and provided with attachment means having a first part and a complementary second part, the first part of attachment means configured to releasably engage the second part of attachment means provided on the mirror plate rear view surface (122) for attaching the mirror plate to the housing, a release mechanism (140, 240, 340, 440) having a gripping element attached to the mirror plate back surface (124) extending to or beyond one side edge of the mirror plate (120) configured such that, in use, a force applied to the gripping means disengages the first part of attachment means from the second part of attachment means releasing the mirror (120) plate from the support arrangement.

20 Claims, 4 Drawing Sheets

(58) Field of Classification Search
USPC .... 248/476, 475.1, 466, 479, 481, 483, 488, 248/27.1, 27.3; 359/841, 872, 875, 876, 359/877
See application file for complete search history.

(56) References Cited

U.S. PATENT DOCUMENTS

| | | | | |
|---|---|---|---|---|
| 4,645,164 | A | | 2/1987 | Manzoni |
| 4,867,408 | A | * | 9/1989 | Ozaki .................... B60R 1/072 248/483 |
| 4,890,908 | A | * | 1/1990 | Casey .................... B60R 1/081 248/467 |
| 5,355,255 | A | * | 10/1994 | Assinder ................. B60R 1/06 248/481 |
| 5,604,645 | A | * | 2/1997 | Weaver .................. B60R 1/072 248/27.3 |
| 5,724,199 | A | * | 3/1998 | Hu .......................... B60R 1/078 359/871 |
| 5,969,890 | A | * | 10/1999 | Whitehead ............. B60R 1/078 248/476 |
| 6,202,976 | B1 | * | 3/2001 | Johnson .................. B60R 1/04 248/476 |
| 6,347,872 | B1 | * | 2/2002 | Brechbill ................ B60R 1/06 359/838 |
| 6,352,348 | B1 | * | 3/2002 | Lang ....................... B60R 1/06 359/881 |
| 6,988,810 | B2 | * | 1/2006 | Chen ..................... B60R 1/078 359/871 |
| 7,370,985 | B2 | * | 5/2008 | Boddy ................... B60R 1/072 248/478 |
| 7,628,498 | B1 | * | 12/2009 | Huang ................... B60R 1/078 359/871 |
| 7,866,835 | B2 | * | 1/2011 | Liu ........................ B60R 1/078 359/844 |
| 7,883,223 | B1 | * | 2/2011 | Foote ..................... B60R 1/072 359/841 |
| 8,579,444 | B2 | * | 11/2013 | Lettis .................... B60R 1/06 359/871 |
| 9,421,912 | B1 | * | 8/2016 | Hu ......................... B60R 1/078 |
| 2001/0009481 | A1 | * | 7/2001 | Apfelbeck ............. B60R 1/072 359/871 |
| 2017/0120826 | A1 | * | 5/2017 | Minikey, Jr. ......... B60Q 1/2665 |
| 2018/0265005 | A1 | * | 9/2018 | Lettis .................... B60R 1/081 |
| 2019/0299865 | A1 | * | 10/2019 | Bergman ............... B60R 1/081 |

* cited by examiner

REAR-VIEW MIRROR ASSEMBLIES FOR VEHICLES

This application is a 35 USC 371 national phase filing of International Application No. PCT/IB2017/001493, filed Nov. 9, 2017, the disclosure of which is incorporated herein by reference in its entirety.

TECHNICAL FIELD

The invention relates to rear-view mirror assemblies for vehicles.

The invention can be applied in any kind of vehicles, in particular heavy-duty such as trucks, buses and construction equipment. However, the invention is not restricted to these particular types of vehicle, but may also be used in other vehicles such as, for example, cars, vans and buses.

BACKGROUND

Vehicle side rear-view mirror assemblies are generally formed of a mirror housing configured to house a mirror plate. The housing defines a recess wherein the mirror plate is mounted. The housing commonly includes a tilting mechanism whereon the mirror plate is fixed, the tilting mechanism making it possible to adjust the angular position of the mirror plate according to a driver's need.

Side rear-view mirror assemblies are secured onto the vehicle door, pillar, fender or any other vehicle body part and as such protrude laterally from the vehicle body. This makes side rear-view mirror assemblies prone to hit other vehicles or surrounding objects. Although side rear-view mirror assembly usually include a retractable mechanism whereby the side rear view mirror assembly pivots when hitting an obstacle, the actual mirror plate can be damaged and has thus to be replaced as it is an important component for a secure driving operation.

Although mirror plate replacement is in theory straightforward, it requires significant skills for an operator. Known rear-view mirror assemblies are difficult to disassemble and cause several problems for operators. Manual effort and dexterity on the part of the operator is usually required.

With one common arrangement, the rear-view mirror is fixed on a plastic backplate provided on its back surface with engagement elements, such as protruding tabs or clips, which have a snap-fit engagement with corresponding elements on a rotating support plate which is in the housing recess.

An alternative arrangement includes providing a steel wire as an engagement element on the back of the rear-view mirror, and the wire then snap-fits into fittings within the housing.

With all of these arrangements, access to the interface between the rear-view mirror and housing is generally very restricted. The operator must tilt the rear-view mirror and then insert his fingers or a tool into the gap between the mirror plate and the housing. It will be appreciate that visibility is very restricted and the operator often must work blindly relying on touch and feel.

Importantly, the mirror plate should be held securely enough in the housing so that it does not fall out in use. This requires a tight fit for the attachment elements, which means a significant force is generally required to pull the mirror plate away from the support element.

Another arrangement is providing sliding tracks on both the back of the rear-view mirror and on a carrier plate within the housing, which enable the rear-view mirror to be slid sideways to mount it in the housing. Again the engagement must be secure between the sliding tracks and so a significant effort on the part of the operator is required to mount and remove the rear-view mirror. Visibility of the mechanism once the rear-view mirror is also restricted, so in order to remove the rear-view mirror the operator must reach into the housing and feel for the components.

Generally, with all of the known arrangements, it is difficult to align the engagement mechanisms and guide the rear-view mirror into place, the removal operation must be done blindly due to restricted visibility, and the operator must use both hands and a significant amount of force. Furthermore, the rear-view mirror is often mounted onto rotative support plate which is moveably mounted within the housing so that the orientation of the rear-view mirror can be adjusted to suit driver requirements. Simply aligning and mounting the rear-view mirror onto a moveable target presents difficulties to the operator.

A further difficulty with heavy-duty vehicles, such as trucks, is that exterior rear-view mirror assemblies are provided at elevated positions on the vehicle body. This means that maintenance work on the rear-view mirror assembly must be carried out at height which adds to the difficulty of the task and presents a potential risk for the operator.

Embodiments of the invention seek to provide rear-view mirror assemblies which overcome some or all of these problems.

SUMMARY

An object of the invention is to provide an improved rear-view mirror assembly where the mirror plate is easier to replace when needed.

According to a first aspect, the invention concerns a rear-view mirror assembly for a vehicle, comprising a housing; a mirror plate having a front rear-view mirrored surface and a back surface; a support arrangement positioned in a recess of the housing and provided with attachment means having a first part and a complementary second part, the first part of attachment means configured to releasably engage the second part of attachment means provided on the mirror plate rear view surface for attaching the mirror plate to the housing, a release mechanism having a gripping element attached to the mirror plate back surface extending to or beyond one side edge of the mirror plate configured such that, in use, a force applied to the gripping means disengages the first part of attachment means from the second part of attachment means releasing the mirror plate from the support arrangement.

The invention thus provides a rear-view mirror having a release mechanism which can be easily gripped and when pulled by a user unlock the attachment means attaching a mirror on a support arrangement.

To that end, the invention relates to a rear-view mirror assembly for a vehicle, comprising a housing, a mirror plate having a front rear-view mirrored surface and a back surface; a support arrangement positioned in a recess of the housing and provided with attachment means having a first part and a complementary second part, the first part of attachment means configured to releasably engage the second part of attachment means provided on the mirror plate rear view surface for attaching the mirror plate to the housing, a release mechanism having a gripping element attached to the mirror plate back surface extending to or beyond one side edge of the mirror plate configured such that, in use, a force applied to the gripping means disengages the first part of attachment means from the second part of attachment means releasing the mirror plate from the support arrangement.

According to an embodiment, the attachment means includes a first part having a deformable element which is deformable between (i) an open configuration and (ii) a closed configuration wherein movement from the closed configuration to the open configuration disengages at least part of the attachment means second part. Advantageously, the release mechanism releasably retains the deformable element in the closed configuration against a bias and the release element is operable to disengage the deformable element.

The release element may further include a clip for releasably holding a portion of the deformable element, and the attachment means may further comprise a wire in an open loop configuration, having two free ends.

Advantageously, the release element includes a clip and an elongate strap, the elongate strap extending to or beyond one side edge of the rear-view mirror.

According to an embodiment, the clip includes at least one recess, the at least one recess being configured to releasably retain one of the free ends of the wire.

According to a further embodiment, the or each recess includes two deformable arms defining a narrow neck portion at an opening of the recess.

The wire may have a regular or irregular polygon configuration or a curved configuration.

The attachment means may further include an auto-lock coupling mean selected from a snap connection, sliding tracks, clips.

According to an embodiment, the support arrangement further includes a titling mechanism to adjust the angle of the mirror plate with regards to housing.

According to another aspect, the invention relates to a vehicle provided with a rear-view mirror assembly as previously described.

According to a further aspect, the invention relates to a method of removing a rear-view mirror from the rear-view mirror assembly as previously described, the method comprising applying a force to the gripping means of the release element such that attachment means disengages from at least one attachment means.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the following embodiments, the terms describing directions relate to the orientation when the rear-view mirror is assembled on a vehicle and during normal use. Therefore, the term "lower" refers to the part closest to the ground, "downwards" means towards the ground, "upper" means distant or remote from the ground, and "upwards" means away from the ground.

Figure 1:
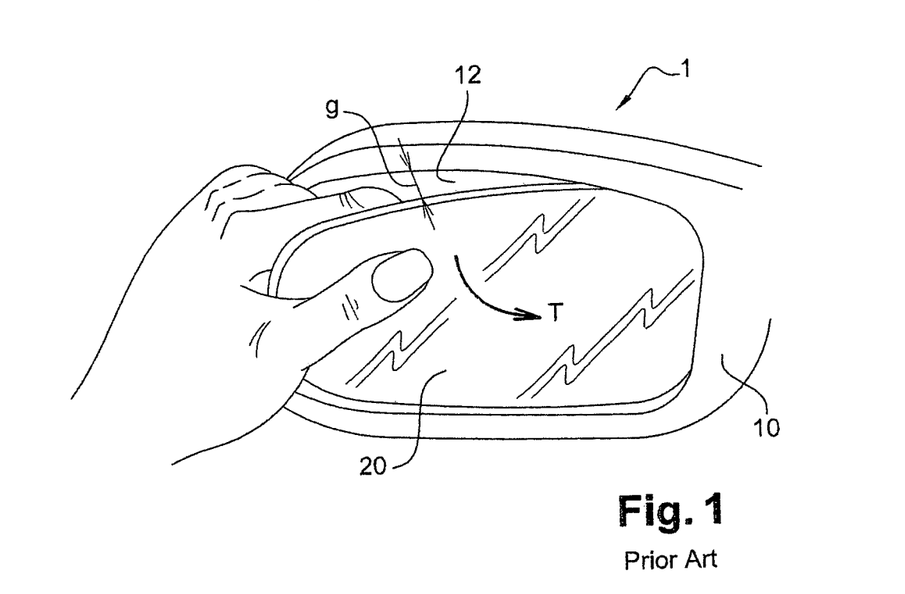
FIG. 1 is a schematic perspective view of a prior art rear-view mirror assembly.

FIG. 1 shows a schematic view known rear-view mirror assembly 1 comprising a housing 10 with a recess 12 and a mirror plate 20 mounted in the recess 12. The mirror plate 20 is mounted to move within the housing 10 so that a driver can adjust its position. To this end, the rear view mirror assembly 1 includes a support arrangement which is located within the housing 10 and which carries the mirror plate 20. The support arrangement is provided with attachment means for attaching the mirror plate 20 onto the support arrangement.

The attachment means can include means such as, for example a snap connection, sliding tracks, clips . . . .

Commonly, the support arrangement also include a tilting mechanism for adjusting the mirror plate angular position within the housing.

To remove the mirror plate 20 in this type of assembly, the operator must firstly tilt the mirror plate 20 to one side (shown with arrow T) which provides a gap g between the mirror plate 20 and housing 10. The operator must then insert finger(s) into the gap and feel for the attachment means and then pull the rear-view mirror away from the housing. As the rear-view mirror nears the housing, visibility is lost and the operators hand must locate the engagement elements blindly in the small gap. Furthermore, the fact that the mirror plate is in a tilting connection with the housing makes any gripping of the mirror plate unstable.

Figure 2A:
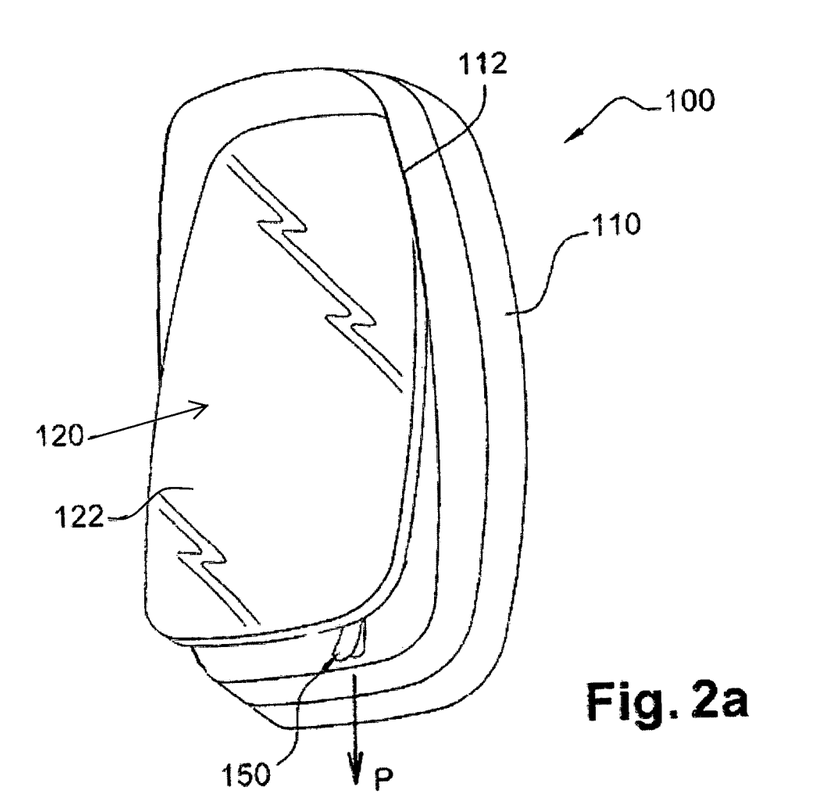
FIG. 2*a* is perspective view of a rear-view mirror assembly in accordance with a first embodiment of the invention.

FIG. 2*a* shows a rear-view mirror assembly 100 according to an embodiment of the invention having a housing 110, a mirror plate 120. The housing 120 defines a recess 112 which receives a support arrangement (not shown) interposed between the housing 100 and the mirror plate 120. The support arrangement is equipped with attachment means for attaching the mirror plate 120 on the coupling means. To this end, the attachment means include a first part provided on the support arrangement configured to releasably engage a complementary second part of attachment means provided on the mirror plate rear view surface 122 for attaching the mirror plate to the housing. The support arrangement is also configured to adjust the angular position of the mirror plate 120. To this end, the support arrangement can suitably include electric motors linked to an appropriate kinematic to adjust the angular position of the mirror plate 120.

Figure 2B:
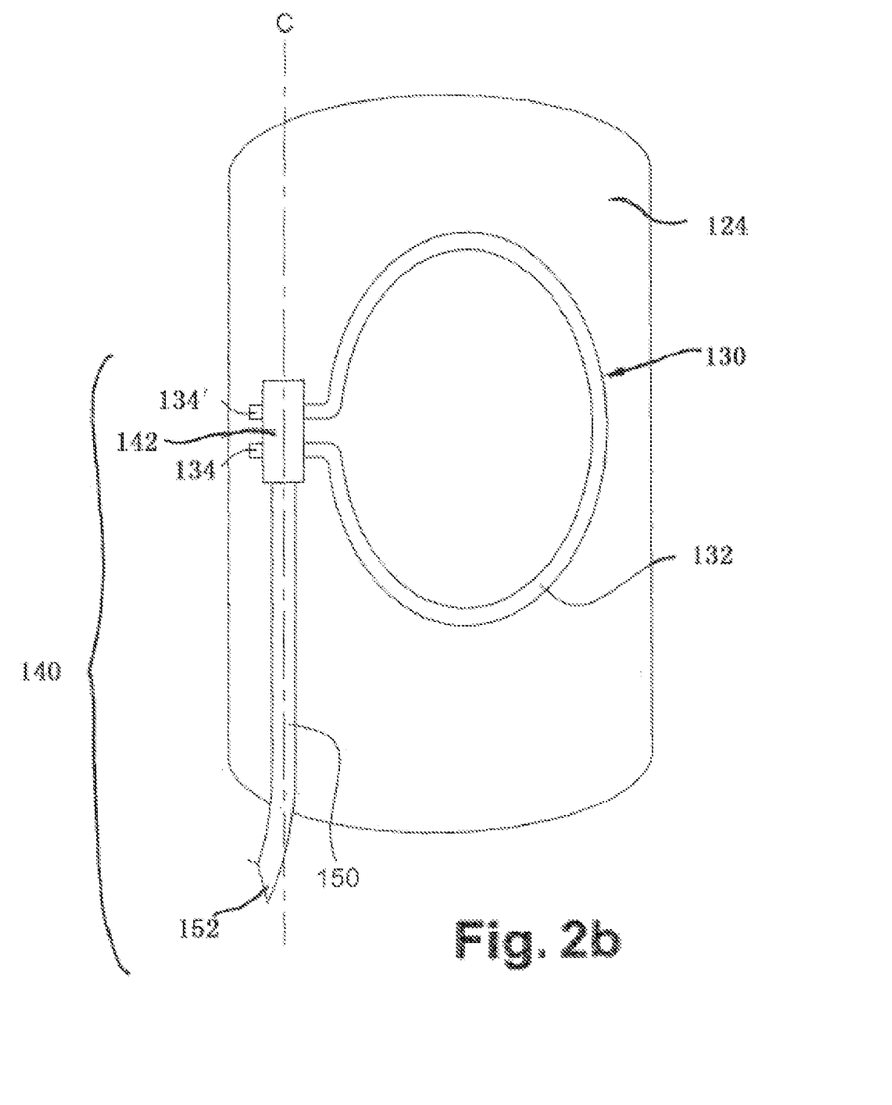
FIG. 2*b* is a view of the back of the rear-view mirror of FIG. 2*a*.

FIG. 2*b* shows a back view of the rear-view mirror 120 from FIG. 2*a*. In this embodiment the support arrangement includes an attachment means. A part of the attachment means in the form of a deformable wire 130 is provided on a back side 124 of the rear-view mirror 120.

In this embodiment, the wire 130 is formed into an open loop 132 having two free ends 134 and 134' which protrude sidewards towards one of the lateral sides of the rear-view mirror. The wire 130 is preferably made from a steel or a steel alloy, or another material with similar properties.

A release element 140 is provided. The release element 140 includes an elongate strap 150 which is secured by a clip 142. The clip 142 releasably holds the free ends of the wire 130 as shown more clearly in the cross-sectional views of FIGS. 3a and 3b. The elongate strap 150 extends to or beyond the lower edge of the rear-view mirror to provide a release tab 152.

Figure 3A:
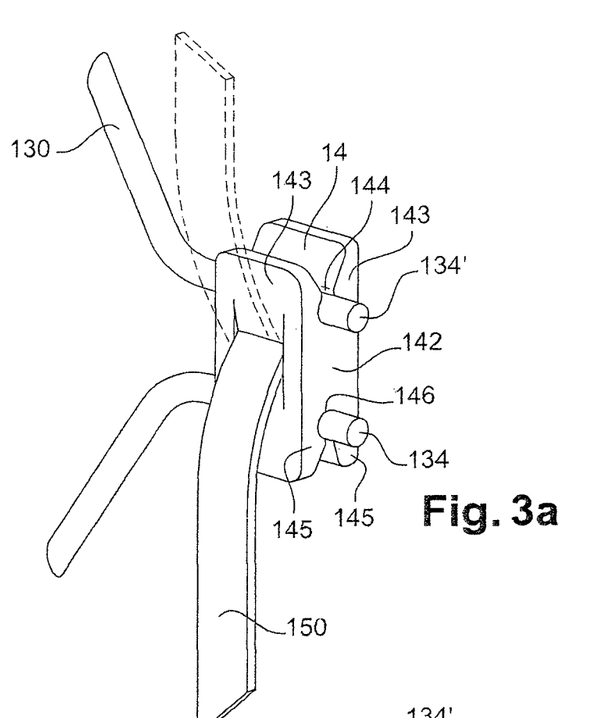
FIG. 3*a* is a close-up perspective view of FIG. 2*b*.

As can be seen in FIG. 3a, the clip 142 includes two resiliently deflectable upper arms 143 which define an upper recess 144 having a narrowed opening (or narrowed neck portion) 144a (see FIG. 3b), in which the upper free end of the wire 134' is releasably held.

Figure 3B:
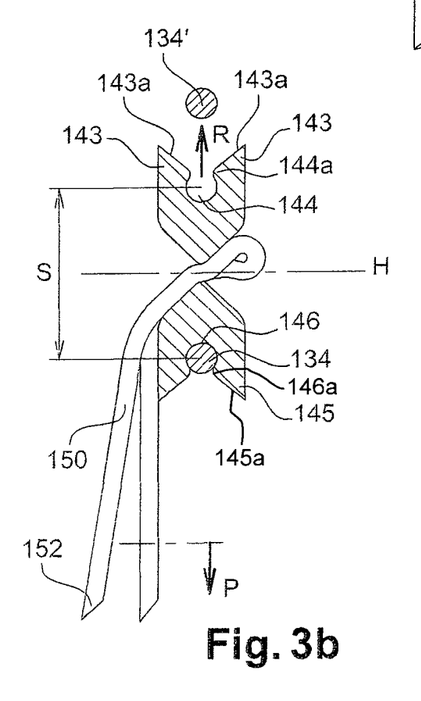
FIG. 3*b* is a cross-sectional view through line C of FIG. 2*b*.

As shown in FIG. 3b, the clip 142 is symmetrical about a central horizontal access H, and includes lower arms 145 defining a lower recess 146 having a narrowed opening 146a for receiving the lower free end 134 of the wire 130. The arms 143, 145 have chamfered distal ends 143a, 145a, which act to guide the wire into engagement with the recesses 144, 146.

A distance S is defined between the centres of the recesses 144, 146. The wire 130 is biased in an open configuration, in which the distance between the free ends of the wire is greater than the distance S. This means that the clip 142 holds the wire against the opening bias when in a closed configuration.

When the wire 130 is in the closed configuration, it can be brought into alignment with a complementary part of the attachement means provided within the housing recess 112 and more specifically provided on the support arrangement (not shown in the figures) and the wire 130 can be snap fitted onto the complementary attachment means.

The complementary attachement means can be of any appropriate known configuration for releasably holding the wire 130.

The flexible strap 150 extends downwards, past the portion of the clip 142 including the recess 146, such that the release tab 152 extends beyond the rear-view mirror 120 (FIG. 2a) providing an actuation member for the operator to grip. This tab 152 constitute a gripping element that enables the operator to actually have the invention work. The strap could also be a flexible loop easily gripped by the user and that could also be pulled easily.

To remove a damaged mirror plate 120, the operator can simply locate the release tab 152, or if this is not visible, simply tilt the rear-view mirror 120 to expose the release tab 152. The operator then pulls in the direction shown by arrow P in the figures. This force pulls the clip 142 downwards. The upper free end of the wire 134' moves upwards in direction shown by arrow R under the biasing force, until the wire reaches its open configuration. The force of the bias overcomes the retaining force of at least one of the housing connection elements and the wire is at least partially disengaged from the housing.

Since the clip 142 is symmetrical and the strap 150 is flexible, any rear-view mirror which is symmetrical about a central axis, can be rotated about 180 degrees and be fitted into the housing in a reverse configuration. This would allow for example, a rear-view mirror configured for use on a left or right hand side of the vehicle to be rotated about 180 degrees and used on the other side.

Figure 3C:
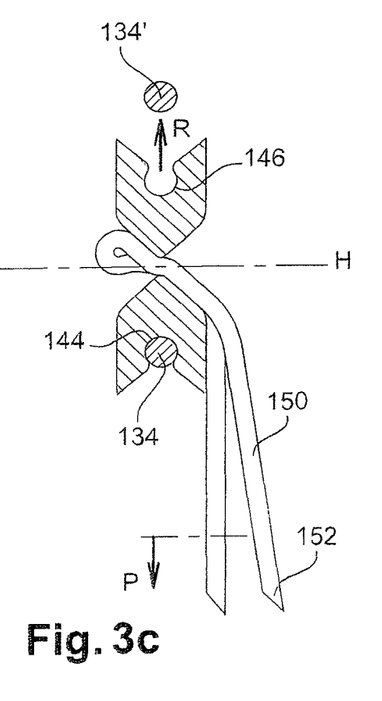
FIG. 3*c* is a cross-sectional view through line C of the rear-view mirror shown in FIG. 2*b* in an inverted position.

FIG. 3c shows the clip 142 rotated about 180 degrees, such that the recess 146 is now on the top to receive upper free end 134'; and recess 144 is now on the bottom to receive the lower free end 134. The flexible strap 150 now extends along the portion of the clip 142 including the recess 144.

The dotted line shown in FIG. 3a shows where the strap would lie when the clip, and wire are rotated about 180 degrees.

Figure 4A:
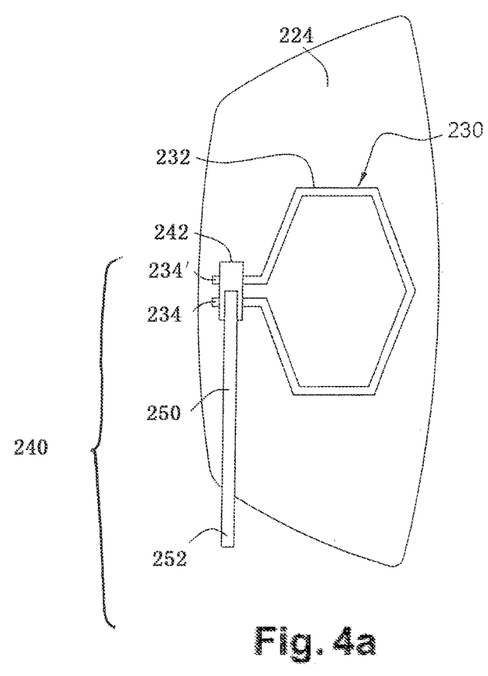
FIGS. 4*a* to 4*c* show back views of rear-view mirrors according to alternative embodiments of the invention.
Figure 4B:
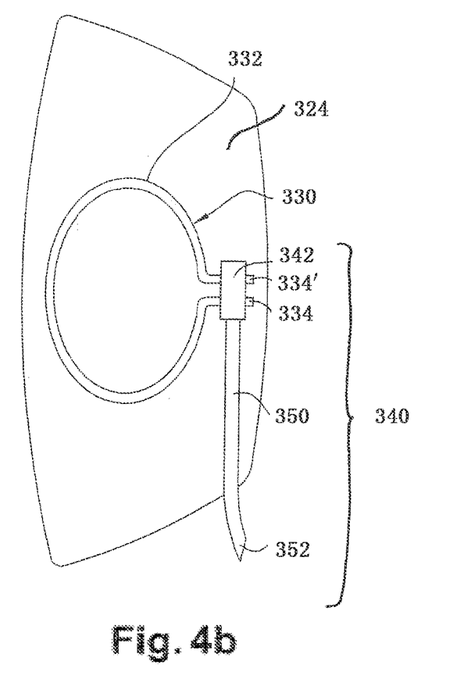
Figure 4C:
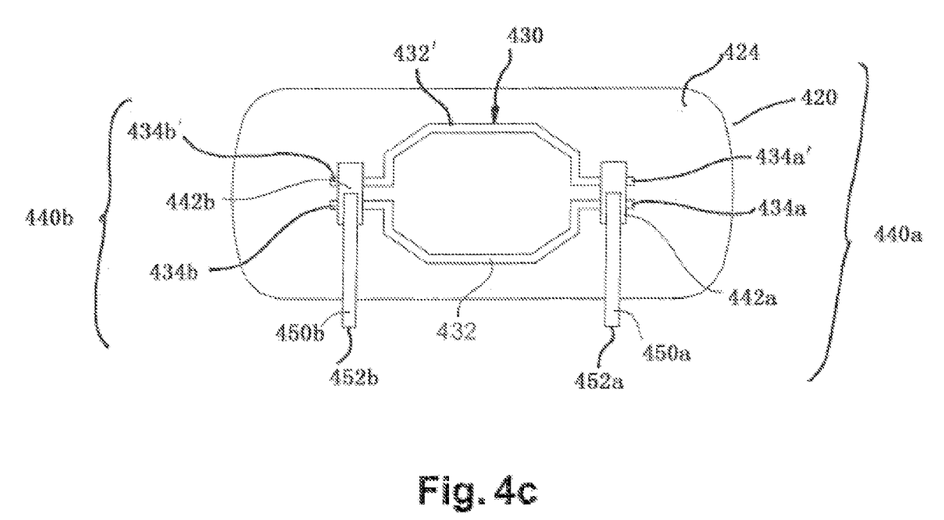

FIGS. 4a, 4b and 4c show alternative embodiments of rear-view mirrors, and in these figures similar reference signs are used as to indicate features corresponding to those of the earlier embodiments.

FIG. 4a shows a rear-view mirror 220 with an attachment means 230 and a release mechanism 240 according to a second embodiment. In this arrangement, the wire 230 is formed in an open hexagonal shape with free ends 234', 234 extending towards one of the long sides of the rear-view mirror. Other features of this embodiment are substantially similar to those of the earlier embodiments.

FIG. 4b shows a rear-view mirror 320 with an attachment means 330 and a release mechanism 340 according to a fourth embodiment.

In this arrangement, the wire 330 is formed in an open loop shape with free ends 334', 334 extending towards one of the long, vertical sides of the rear-view mirror. Other features of this embodiment are substantially similar to those of the earlier embodiments.

It will be appreciated that the wire of the attachment means can be formed of any polygonal or curved shape. The wire is generally formed of a regular shape, since the alignment of the corresponding connection elements within the housing will be easier. However, it will be appreciated that other irregular shaped wires can be used. This might be appropriate for example if space within the housing is limited or restricted by other components mounted in the housing.

FIG. 4c, shows a rear-view mirror 420 with an attachment means 430 according to a fourth embodiment. In this embodiment, the rear-view mirror is schematically shown as having a rounded rectangular shape and this is intended to generally illustrate an example of a type rear-view mirror which extends horizontally, i.e. having its longer edges lying substantially in a horizontal direction. As with the above embodiments, the rear-view mirror 420 is provided on its back side 424 with the attachment means 430. In this arrangement, the attachment means is formed of two sections, namely two separate, symmetrical wire portions 432 and 432'. The wire portions 432, 432' have free ends extending to each of the shorter (vertical in FIG. 4c) sides of the rear-view mirror. Two clips 442a, 442b are provided, one at each side of the wires, each clip 442a, 442b releasably retaining a free end of the upper wire portion 434' and a free end of the lower wire portion 434. A release element 450a, 450b is connected to each clip 442a, 442b, each release element 450a, 450b including an elongate strap and a release tab 452a, 452b. To release the rear-view mirror 420 from a housing (not shown), the operator must pull on both release tabs 452a, 452b. This could be done by pulling the two tabs 452a, 452b simultaneously, or sequentially. In this embodiment each wire has a half-octagonal shape, but it will be appreciated that two clips and two release elements could be provided on a two-part attachment means having different geometric shapes, for example, two semi-circular wires.

The two-part attachment means with double clip and double release tab arrangement is particularly advantageous in certain applications, for example for mounting a large rear-view mirror within a housing.

In modified embodiments (not shown), the attachment may comprise a wire having a first end fixed to the back surface of the rear-view mirror, and one free end which is releasably held by a clip provided on the release mechanism. In this embodiment, the wire is also held in the clip against a bias, and when the free end is released from the clip it moves away from the clip in order to disconnect from the connector(s) on the housing.

In further modified embodiments (not shown), the release element is provided having a proximal end which is integrally formed with the clip.

In further modified embodiments (not shown), the housing may be provided with a groove or recess in the area of the distal end of the release element (release tab). The release tab can sit in this groove or recess when the rear-view mirror is in regular use, and then the operator will easily and quickly be able to locate the release tab when required.

In further modified embodiments (not shown), the release element is a rigid element, which extends from the upper or lower end of the clip to a point on or adjacent to the perimeter of the rear-view mirror. With such an arrangement, the rear-view mirror can be reoriented to substantially any rotational position, since the rigid release element will always remain in the same orientation relative to the rear-view mirror. For example, if the rear-view mirror were to be rotated by 90, 180 or 270 degrees it would extend sideways or upwards and the release tab could be pulled sideways or upwards accordingly to move the clip and free the free end of the wire. Such an arrangement might be useful, for example, in a situation where access to the lower part of the rear-view mirror assembly is difficult or restricted.

Although the invention has been described in relation to a side vehicle rear-view mirror assembly, it will be appreciated that the invention can be applied to internal vehicle rear-view mirror assemblies, and indeed any other rear-view mirror assembly in which a rear-view mirror is releasably mounted into a housing. Whilst the invention has been described above, it extends to any inventive combination of the features set out above or in the following description or drawings.

The invention claimed is:

1. A rear-view mirror assembly for a vehicle, comprising:
a housing;
a mirror plate having a front rear-view mirrored surface and a back surface;
a support arrangement positioned in a recess of the housing and provided with an attachment having a first part and a complementary second part, the first part of the attachment configured to releasably engage the second part of the attachment provided on the back surface of the mirror plate for attaching the mirror plate to the housing; and
a release mechanism having a gripping element attached to the back surface of the mirror plate extending to or beyond one side edge of the mirror plate configured to, by application of a force to the gripping element, disengage the first part of the attachment from the second part of the attachment to release the mirror plate from the support arrangement;
wherein the first part of the attachment includes a deformable element which is deformable between an open configuration and a closed configuration; and
wherein movement from the closed configuration to the open configuration disengages at least a portion of the second part of the attachment.

2. The rear-view mirror assembly of claim 1, wherein the release mechanism releasably retains the deformable element in the closed configuration against a bias and the release element is operable to disengage the deformable element.

3. The rear-view mirror assembly of claim 1, wherein the release element includes a clip for releasably holding a portion of the deformable element.

4. The rear-view mirror assembly of claim 1, wherein the attachment comprises a wire in an open loop configuration, having two free ends.

5. The rear-view mirror assembly of claim 1 wherein the attachment includes an auto-lock coupling comprising at least one of a snap connection, sliding tracks, or clips.

6. The rear-view mirror assembly of claim 1, wherein the support arrangement further includes a titling mechanism to adjust an angle of the mirror plate with regards to the housing.

7. A vehicle, comprising:
a rear-view mirror assembly, comprising:
a housing;
a mirror plate having a front rear-view mirrored surface and a back surface;
a support arrangement positioned in a recess of the housing and provided with an attachment having a first part and a complementary second part, the first part of the attachment configured to releasably engage the second part of the attachment provided on the back surface of the mirror plate for attaching the mirror plate to the housing; and
a release mechanism having a gripping element attached to the back surface of the mirror plate extending to or beyond one side edge of the mirror plate configured to, by application of a force to the gripping element, disengage the first part of the attachment from the second part of the attachment to release the mirror plate from the support arrangement;
wherein the first part of the attachment includes a deformable element which is deformable between an open configuration and a closed configuration; and
wherein movement from the closed configuration to the open configuration disengages at least a portion of the second part of the attachment.

8. The vehicle of claim 7, wherein the release mechanism releasably retains the deformable element in the closed configuration against a bias and the release element is operable to disengage the deformable element.

9. A method of removing a rear-view mirror from a rear-view mirror assembly, comprising:
applying a force to a gripping element of a release mechanism attached to a back surface of a mirror plate extending to or beyond one side edge of the mirror plate of a rear-view mirror assembly such that a first part of an attachment of a support arrangement of the rear-view mirror assembly disengages from a complementary second part of the attachment of the support arrangement on the back surface of the mirror plate releasing the mirror plate from the support arrangement positioned in a recess of a housing, the mirror plate having a front rear-view mirrored surface;
wherein the first part of the attachment includes a deformable element which is deformable between an open configuration and a closed configuration; and
wherein movement from the closed configuration to the open configuration disengages at least a portion of the second part of the attachment.

10. The method of claim 9, wherein the release mechanism releasably retains the deformable element in the closed configuration against a bias and the release element is operable to disengage the deformable element.

11. A rear-view mirror assembly for a vehicle, comprising:
- a housing;
- a mirror plate having a front rear-view mirrored surface and a back surface;
- a support arrangement positioned in a recess of the housing and provided with an attachment having a first part and a complementary second part, the first part of the attachment configured to releasably engage the second part of the attachment provided on the back surface of the mirror plate for attaching the mirror plate to the housing; and
- a release mechanism having a gripping element attached to the back surface of the mirror plate extending to or beyond one side edge of the mirror plate configured to, by application of a force to the gripping element, disengage the first part of the attachment from the second part of the attachment to release the mirror plate from the support arrangement;
- wherein the attachment comprises a wire in an open loop configuration, having two free ends.

12. The rear-view mirror assembly of claim 11, wherein the release element includes a clip and an elongate strap, the elongate strap extending to or beyond the one side edge of the rear-view mirror.

13. The rear-view mirror assembly of claim 12, wherein the clip includes at least one recess, the at least one recess configured to releasably retain one of the free ends of the wire.

14. The rear-view mirror assembly of claim 13, wherein the at least one recess includes two deformable arms defining a narrow neck portion at an opening of the recess.

15. The rear-view mirror assembly of claim 11, wherein the wire has a regular or irregular polygon configuration.

16. The rear-view mirror assembly of claim 11, wherein the wire has a curved configuration.

17. A vehicle, comprising:
- a rear-view mirror assembly, comprising:
  - a housing;
  - a mirror plate having a front rear-view mirrored surface and a back surface;
  - a support arrangement positioned in a recess of the housing and provided with an attachment having a first part and a complementary second part, the first part of the attachment configured to releasably engage the second part of the attachment provided on the back surface of the mirror plate for attaching the mirror plate to the housing; and
  - a release mechanism having a gripping element attached to the back surface of the mirror plate extending to or beyond one side edge of the mirror plate configured to, by application of a force to the gripping element, disengage the first part of the attachment from the second part of the attachment to release the mirror plate from the support arrangement;
  - wherein the attachment comprises a wire in an open loop configuration, having two free ends.

18. The vehicle of claim 17, wherein the release element includes a clip and an elongate strap, the elongate strap extending to or beyond the one side edge of the rear-view mirror.

19. A method of removing a rear-view mirror from a rear-view mirror assembly, comprising:
- applying a force to a gripping element of a release mechanism attached to a back surface of a mirror plate extending to or beyond one side edge of the mirror plate of a rear-view mirror assembly such that a first part of an attachment of a support arrangement of the rear-view mirror assembly disengages from a complementary second part of the attachment of the support arrangement on the back surface of the mirror plate releasing the mirror plate from the support arrangement positioned in a recess of a housing, the mirror plate having a front rear-view mirrored surface;
- wherein the attachment comprises a wire in an open loop configuration, having two free ends.

20. The method of claim 19, wherein the release element includes a clip and an elongate strap, the elongate strap extending to or beyond the one side edge of the rear-view mirror.

* * * * *